United States Patent [19]

Inoue et al.

[11] Patent Number: 4,848,852
[45] Date of Patent: * Jul. 18, 1989

[54] BRAKING SYSTEM FOR AUTOMOTIVE VEHICLE

[75] Inventors: Hideo Inoue, Kanagawa; Masashi Ohta, Susono; Tatsuo Sugitani, Mishima, all of Japan

[73] Assignee: Toyota Jidosha Kabushiki Kaisha, Aichi, Japan

[*] Notice: The portion of the term of this patent subsequent to Oct. 18, 2005 has been disclaimed.

[21] Appl. No.: 929,416

[22] Filed: Nov. 12, 1986

[30] Foreign Application Priority Data

Nov. 14, 1985 [JP] Japan .................. 60-255720

[51] Int. Cl.⁴ .................. B60T 8/58; B60T 8/86; B60T 13/74
[52] U.S. Cl. .................. 303/100; 303/93; 303/3; 188/106 P
[58] Field of Search .................. 192/3 TR; 180/197; 303/3, 6 A, 6 R, 93, 94, 100, 103, 106, 108, 109, 110, 111, 113, 116, 119, 114, 6.01, 9.61; 188/181 A, 106 P

[56] References Cited

U.S. PATENT DOCUMENTS

| | | | |
|---|---|---|---|
| 3,895,698 | 7/1975 | Fontaine | 192/3 TR |
| 3,934,939 | 1/1976 | Hida | 303/100 |
| 3,971,595 | 7/1976 | Kondo | 303/113 |
| 4,093,316 | 6/1978 | Reinecke | 303/100 |
| 4,143,842 | 3/1979 | Ubel | 303/93 |
| 4,327,414 | 4/1982 | Klein | 303/108 |
| 4,508,393 | 4/1985 | Drometer | 303/111 |
| 4,509,802 | 4/1985 | Solleder et al. | 180/197 |
| 4,602,702 | 7/1986 | Ohta et al. | 303/20 X |
| 4,602,824 | 7/1986 | Nishimura et al. | 303/100 |
| 4,629,039 | 12/1986 | Imoto et al. | 303/113 X |
| 4,630,871 | 12/1986 | Imoto et al. | 303/114 |
| 4,658,939 | 4/1987 | Kircher et al. | 303/3 |
| 4,664,453 | 5/1987 | Kade et al. | 303/100 |

FOREIGN PATENT DOCUMENTS

| | | |
|---|---|---|
| 51-006308 | 2/1976 | Japan . |
| 113792 | 7/1981 | Japan . |
| 71014 | 4/1982 | Japan . |
| 2080458 | 2/1982 | United Kingdom .................. 303/3 |

Primary Examiner—Andres Kashnikow
Assistant Examiner—Timothy Newholm
Attorney, Agent, or Firm—Oliff & Berridge

[57] ABSTRACT

A braking system for an automotive vehicle, having a first brake system and a second brake system. The first brake system includes a master cylinder responsive to an operation of an operator-controller brake operating member, for generating a fluid pressure which corresponds to an operation value of the brake operating member, and a first brake actuated by the fluid pressure generated by the master cylinder. The first brake is adapted to produce a braking effect which is smaller than a desired or optimum braking effect corresponding to the operation value of the brake operating member. The second brake system has a second brake and is controlled by a controller such that the second brake produces a braking effect which is equal to a difference between an actual braking effect applied to the vehicle, and the desired braking effect.

14 Claims, 2 Drawing Sheets

BRAKING SYSTEM FOR AUTOMOTIVE VEHICLE

BACKGROUND OF THE INVENTION

1. Field of the Invention

The present invention relates in general to a braking system for automotive vehicles such as four-wheel automobiles, two-wheel motor cycles, or various vehicles or trucks for industrial purposes.

2. Discussion of the Prior Art

Hydraulically operated braking systems have long been used for automotive vehicles. Such a hydraulically operated braking system includes an operator-controlled brake operating member, a master cylinder responsive to the operation of the brake operating member, for generating a fluid pressure corresponding to an operating force acting on the brake operating member, and brakes actuated by the fluid pressure developed by the master cylinder, in order to apply brakes to the wheels of a vehicle. The braking effect produced by the brakes can be adjusted by the vehicle operator, by controlling the operating force exerted on the brake operating member.

In the hydraulic braking system of the type indicated above, the actual braking effect may be varied due to changes in the friction coefficient of the brake pads and in the load condition of the vehicle, even if the operating force on the brake operating member is kept constant. Also, it is difficult to precisely or intricately control the operating force acting on the brake operating member. Accordingly, the braking effect may be fluctuated as a function of time during brake application by a single operation of the brake operating member. Thus, the conventional hydraulic braking system suffers from the drawbacks discussed above.

In view of the above drawbacks, provisions for automatic intricate control of the fluid pressure in the master cylinder have been proposed in recent years. An example of a braking system incorporating such provisions is disclosed in Laid-Open Publication No. 58-188746 of Japanese Patent Application, wherein a booster of a hydraulic pressure type is disposed between the brake operating member and the master cylinder. The boosting ratio of the booster is automatically controlled to precisely regulate the fluid pressure to be generated by the master cylinder, so that the desired braking effect can be obtained under any conditions.

In the proposed system indicated above wherein the level of the fluid pressure generated by the master cylinder is regulated, it is required that the fluid pressures in the brakes connected to the master cylinder be changed over a wide range, from a low level used for light braking, up to a high level required for rapid and heavy braking. A braking system capable of producing a suitably controlled braking effect over such a wide range of the brake pressure is difficult to design and manufacture.

It will be understood that the amount or force of operation of the brake operating member by the vehicle driver substantially corresponds to a magnitude of a braking effect desired by the vehicle driver. Therefore, although the actual braking effect obtained does not agree to the desired or optimum braking effect, the amount of deviation of the actual braking effect from the desired braking effect is usually not so large. In light of this relatively small deviation, it is considered to provide a braking system which has a second brake, in addition to a first brake which is actuated to provide a braking effect corresponding to the amount or force of operation of the brake operating member by the vehicle driver. According to this arrangement, the first brake is designed so that the braking effect produced is slightly smaller than the desired or ideal braking effect, while the second brake is used to provide a braking effect which is equal to a difference between the braking effect produced by the first brake and the desired braking effect. In this case, a controller is used only for the second brake, for regulating the braking effect to be produced by the second brake. Thus, the required range of control of the controller is comparatively narrow.

The above concept of using a second brake assigned to compensate for a shortage of braking effect produced by a first brake has not been found in the prior art, except a similar type of arrangement as disclosed in Laid-Open Publication No. 57-51562 of Japanese Patent Application, wherein a fluid type retarder is used as a second brake, in addition to a hydraulically operated friction brake as a first brake. In this arrangement, the retarder is used to compensate for a shortage of the braking effect of the first brake with respect to the desired braking effect. However, the braking effect to be produced by such a retarder as a special brake cannot be controlled by the vehicle operator. Further, the retarder provides substantially no braking effect while the vehicle is running at a low speed. In this arrangement, too, therefore, the friction brake as the first brake should provide a braking effect which is variable over a wide range. An anti-skid braking system is disclosed in U.S. Pat. No. 4,508,393, wherein two brake cylinders are provided for a single disc rotor of a wheel. The pressures in the two brake cylinders are controlled independently of each other, so as to prevent skidding of the wheel on the road surface. In this arrangement, however, the fluid pressures in the two brake cylinders are not controlled as a function of the amount or force of operation of the brake operating member by the vehicle operator, while the fluid pressures are automatically controlled by a controller of the braking system. Hence, the controller of this anti-skid braking system is also required to be capable of controlling the fluid pressures over a wide range.

SUMMARY OF THE INVENTION

It is accordingly an object of the present invention to provide a braking system for an automotive vehicle, equipped with a controller whose control range is relatively narrow, and which is capable of effecting an optimum control of the braking effect over a relatively wide range. That is, the present invention was developed for solving the drawback encountered on the conventional braking system, that the controller is difficult to design due to the requirement of its capability to provide a relatively wide range of control of the braking effect.

The above object may be achieved by the present invention which provides a braking system for an automotive vehicle, having a first and a second brake system. The first brake system includes an operator-controlled brake operating member, a master cylinder responsive to an operation of the brake operating member, for generating a fluid pressure which corresponds to an operation value of the brake operating member, and a first brake actuated by the fluid pressure generated by the master cylinder, so as to produce a braking effect which is smaller than a desired braking effect corresponding to the operation value of the brake operating member. The second brake system includes a second brake, a first detecting device for detecting the operation value, a second detecting device for detecting an actual braking effect applied to the vehicle, and a controller connected to the second brake, and the first and second detecting devices. The controller is operable to compare the actual braking effect with the desired braking effect, and operate the second brake so as to produce a braking effect equal to a difference between the actual and desired braking effects.

In the braking system of the present invention constructed as described above, the fluid pressure in the first brake is changed or controlled substantially in proportion with a change in the operating force or amount of the brake operating member operated by the vehicle driver. Further, the braking effect produced by the first brake is smaller than the desired braking effect which is predetermined corresponding to the varying amount or force of operation of the brake operating member. On the other hand, the second brake is regulated by the controller so that the braking effect produced by the second brake is equal to a difference between the braking effect produced by the first brake, and the desired braking effect.

Stated differently, the controller is merely required to control the braking effect of the second brake over a range which corresponds to a relatively narrow range of possible variation of the difference between braking effect produced by the first brake, and the desired braking effect. Therefore, the controller may serve its function even if its control range is relatively narrow.

Although the braking effect to be produced by the first brake is smaller than the desired braking effect, the former is close to the latter. In other words, the difference of the actual braking effect of the first brake from the desired or optimum braking effect is relatively small, even when the desired braking effect is relatively large. In this connection, it is noted that the range of a possible variation in the difference between a actual and desired braking effects is narrower than a range of a possible variation in the desired braking effect itself. Hence, the range of control of the controller assigned to compensate for the difference between the actual and desired braking effects is narrower than the range of control of a controller assigned to compensate for the possible variation in the desired braking effect. Thus, the controller used according to the invention is comparatively easy to design and reliable in the accuracy of controlling the braking effect applied to the vehicle.

Further, the instant braking system wherein the first and second brake systems are independent of each other, assures an increased degree of safety. Namely, if one of the two brake system fails to normally operate, the other brake system can operate normally.

According to one feature of the invention, the controller includes a computer which comprises a control pattern memory storing at least one braking-effect control pattern representative of a relation between the operation value of the brake operating member and the desired braking effect.

In one form of the above feature of the invention, the control pattern memory stores a plurality of braking-effect control patterns representative of different relations between the operation value and the desired braking effect. In this case, the computer automatically selects a predetermined one of the plurality of braking-effect control patterns, as an initially set pattern, upon application of power to the controller. The braking system further comprises an operator-controlled pattern selector means connected to the controller. The computer replaces the automatically selected one of the braking-effect control patterns by another selected by the pattern selector means.

In another form of the above feature of the invention, the first detecting device detects an operating force exerted to the brake operating member, and the second detecting device detects a rate of deceleration of the vehicle. The control pattern memory stores control pattern data representative of a relation between the operation force and the rate of deceleration. The operator-controlled brake operating member may be a foot-operated brake pedal, and the first detecting device may be a pressure sensor disposed on a pedal pad of the brake pedal. The second detecting device may be a deceleration sensor operable for detecting the rate of deceleration of the vehicle.

In a further form of the same feature of the invention, the first brake and the second brake are provided for each of a left-front and a right-front wheel, and a left-rear and a right-rear wheel of the vehicle. In this case, the controller includes a control pattern memory storing at least one distribution control pattern representative of a desired relation between a sum of front-wheel brake forces of the first and second brakes for the left-front and right-front wheels, and a sum of rear-wheel brake forces of the first and second brakes for the left-rear and right-rear wheels. The second brake for the left-front and right-front wheels is controlled according to the desired relation. In this arrangement, the braking device may further comprise a front-wheel load sensor for sensing a load applied to the left-front and right-front wheels, a rear-wheel load sensor for sensing a load applied to the left-rear and right-rear wheels, a front-wheel brake-force sensor for sensing the front-wheel brake forces, and a rear-wheel brake-force sensor for sensing the rear-wheel brake forces.

In a still further form of the same feature of the invention, the controller includes a control pattern memory which stores a timing control pattern indicative of a relation between a time lapse from a start of brake application to the vehicle, and a desired braking effect. In this case, the second brake is controlled according to the relation between the time lapse and the desired braking effect.

According to another feature of the invention, the second brake is hydraulically operated, and the second brake system includes: a hydraulic pressure source operated by a power unit to generate a fluid pressure; a reservoir for storing a working fluid; and second solenoid-operated control valve means controlled by the controller, between a first position for communication of a brake cylinder of the second brake with the hydraulic pressure source, and a second position for communication of the brake cylinder of the second brake with the reservoir.

In accordance with a further feature of the invention, the first brake system further includes: first solenoid-operated valve means disposed in a fluid passage between the master cylinder and the first brake, and operable between a first position for communication of the first brake with the master cylinder, and a second position for communication of the first brake with a reservoir; and an emergency control circuit operable for normally placing the first solenoid-operated control valve means in the first position for communication of the first brake with the master cylinder, and for placing the first solenoid-operated control valve means in the second position for communication of the first brake with the reservoir, if the actual braking effect produced by the first brake exceeds the desired braking effect.

According to a still further feature of the invention, controller includes a traction controller operable for activating the second brake so as to maintain a slip ratio of a drive wheel of the vehicle within another predetermined optimum range, if the slip ratio has exceeded another predetermined upper limit, when the vehicle is started.

According to a yet further feature of the invention, the controller includes a controller operable for activating the second brake while the vehicle is temporarily stopped.

BRIEF DESCRIPTION OF THE DRAWINGS

The foregoing and optional objects, features and advantages of the present invention will be better understood by reading the following detailed description of a preferred embodiment of the invention, when considered in connection with the accompanying drawings, in which.

DETAILED DESCRIPTION OF THE PREFERRED EMBODIMENT

Figure 1:
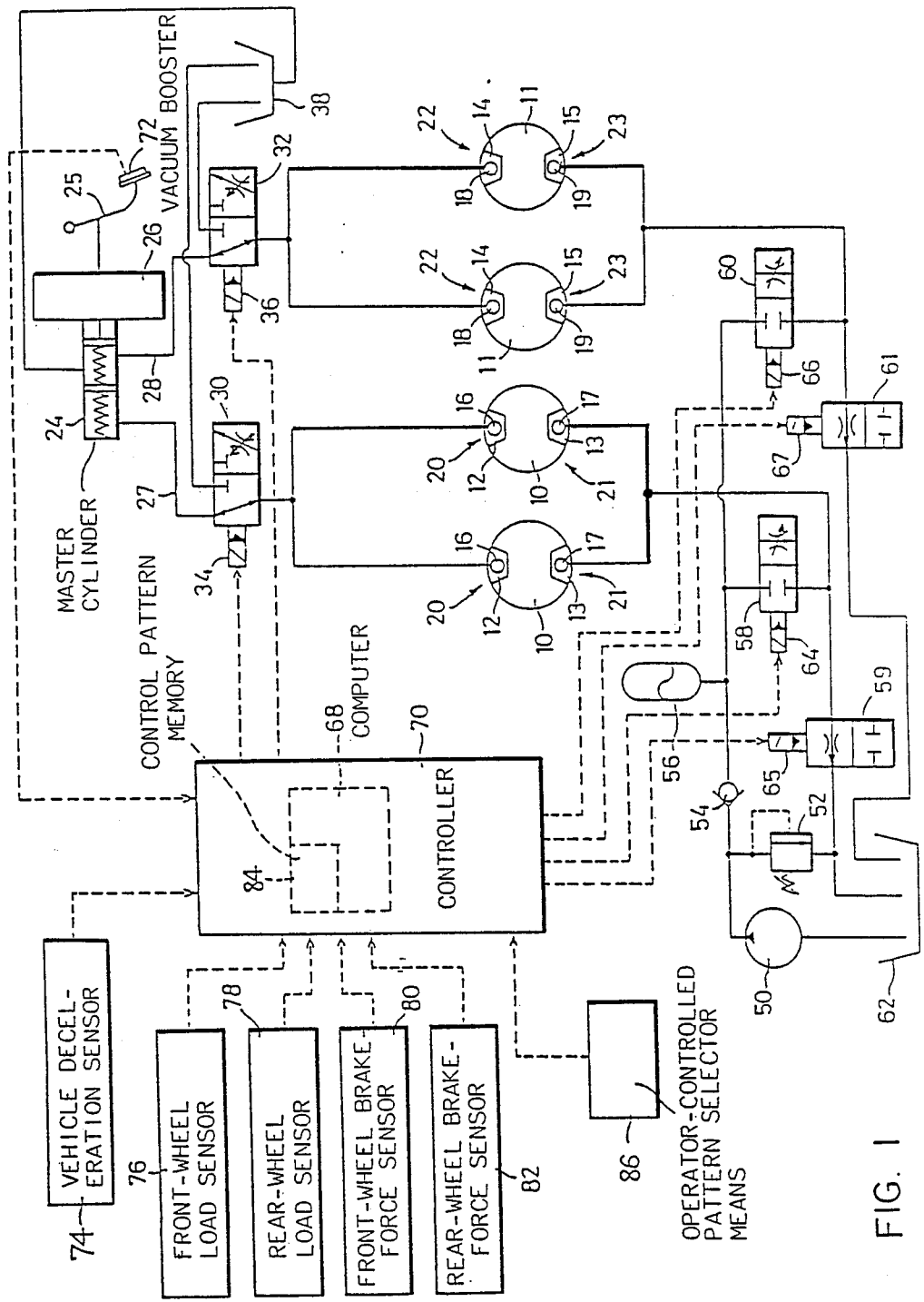
FIG. 1 is a schematic diagram showing one embodiment of a braking system of the present invention for an automotive vehicle.

Referring first to FIG. 1, two pairs of circles indicated by reference numerals 10, 11 represent corresponding two pairs of disc rotors. The two disc rotors 10 are respectively attached to a left-front and a right-front wheel of a four-wheel automotive vehicle, while the two disc rotors 11 are respectively attached to a left-rear and a right-rear wheel of the vehicle. Each of the front disc rotors 10 is equipped with a pair of calipers 12, 13. Similarly, each of the rear disc rotors 11 is equipped with a pair of calipers 14, 15. Each of the calipers 12, 13, 14, 15 has a brake cylinder 16, 17, 18 or 19. With a hydraulic pressure applied to each of these brake cylinders, a pair of brake pads are forced against the opposite friction surfaces of the corresponding disc rotor 10, 11, whereby the rotating motions of the disc rotors and consequently the corresponding wheels are restrained. Thus, a brake is applied to the vehicle. Brakes having the brake cylinder 16 are referred to as first front-wheel brakes 20, while brakes having the brake cylinder 17 are referred to as second front-wheel brakes 21. Similarly, brakes having the brake cylinder 18 are referred to as first rear-wheel brakes 22, while brakes having the brake cylinder 19 are referred to as second rear-wheel brakes 23.

The brake cylinders 16, 18 of the first front-wheel and rear-wheel brakes 20, 22 are supplied with a pressurized fluid generated by a master cylinder 24. An operator-controlled brake operating member in the form of a brake pedal 25 is connected via a vacuum booster 26 to the master cylinder 24. An operating force or depression force exerted to the brake pedal 24 by the vehicle operator is boosted by the vacuum booster 26, and the boosted force is imparted to the master cylinder 24. As a result, the same level of fluid pressure is generated in two mutually independent pressure chambers of the master cylinder 24. The fluids pressurized in the two pressure chambers are delivered to the brake cylinders 16 of the first front-wheel brakes 20, and to the brake cylinders 18 of the first rear-wheel brakes 22, through corresponding conduits 27, 28, and through corresponding solenoid-operated control valves 30, 32, respectively. Normally, the solenoid-operated control valves 30, 32 are placed in their first position shown in FIG. 1, in which the master cylinder 24 is held in communication with the brake cylinders 16, 18. With controlled amounts of an electric current applied to solenoids 34, 36, the control valves 30, 32 are placed in their second position for communication of the brake cylinders 16, 18 with a reservoir 38. Namely, the control valves 30, 32 in the second position allow the pressurized brake fluid in the brake cylinders 16, 18 to be discharged into the reservoir 38, at flow rates determined by the amount of electric currents applied to the respective solenoids 34, 36. The brake cylinders 16, 18 of the first front-wheel and rear-wheel brake 20, 22 are designed so as to produce a braking effect which is smaller than an optimum or desired braking effect that is predetermined corresponding to the specific operation or depression force exerted on the brake pedal 25. However, if the braking effect produced by the brake cylinders 16, 18 exceeds the desired braking effect for some reason or other, for example, due to an abnormally high friction coefficient of the disc rotors 10, 11 due to development of rust, the solenoid-operated control valves 30, 32 are activated to reduce the fluid pressures in the brake cylinders 16, 18. Thus, the control valves 30, 32 are provided as a safety device which is operated in such situations. The first front-wheel and rear-wheel brakes 20, 22, master cylinder 24, brake pedal 25, conduits 27, 28, solenoid-operated control valves 30, 32, reservoir 38, cooperate to constitute a major part of a first brake system of the instant braking system.

On the other hand, the brake cylinders 17, 19 of the second front-wheel and rear-wheel brakes 21, 23 are supplied with a pressurized fluid delivered from a hydraulic pressure source, which includes a hydraulic pump 50, a relief valve 52, a check valve 54 and an accumulator 56. The flows of the fluids to and from the brake cylinders 17, 19 are controlled by a pair of solenoid-operated control valves 58, 59, and a pair of solenoid-operated control valves 60, 61, respectively. These control valves 58, 59, 60 and 61 are normally placed in their first position of FIG. 1, in which the brake cylinders 17, 19 are disconnected from the hydraulic pressure source, and are held in communication with a reservoir 62. With controlled amounts of an electric current applied to respective solenoids 64, 65, 66, 67, the control valves 58-61 are placed in their second position in which the brake cylinders 17, 19 are disconnected from the reservoir 62, and are held in communication with the pressure source, so that the fluid pressures in the brake cylinders 17, 19 are raised. The rate of rise in the fluid pressure may be changed by adjusting the amounts of electric current to the solenoids 64, 66. The second front-wheel and rear-wheel brakes 21, 23 having the brake cylinders 17, 19, hydraulic pump 50, accumulator 56 and solenoid-operated control valves 58-61, cooperate to constitute a major part of a second brake system of the braking system.

The supply of an electric current to the solenoids 34, 36, 64, 65, 66 and 67 is controlled by a controller 70 which is mainly constituted by a computer 68. To the controller 70 is connected a pressure sensor 72 disposed on a pedal pad of the brake pedal 25. This pressure sensor 72 serves as a detecting device for detecting an operation force exerted to the brake operating member in the form of the brake pedal 25. There is also connected to the controller 70 a vehicle deceleration sensor 74 which is adapted to generate an electric signal indicative of a rate of deceleration (or acceleration) of the vehicle. The deceleration sensor 74 serves as a detecting device for detecting an actual braking effect applied by the braking system to the vehicle.

Also connected to the controller 70 are: a front-wheel load sensor 76 which detects a load applied to the front wheels; a rear-wheel load sensor 78 which detects a load applied to the rear wheels; a front-wheel brake-force sensor 80 which detects a brake force produced by the front wheels; and a rear-wheel brake-force sensor 82 which detects a brake force produced by the rear wheels. For instance, the front-wheel and rear-wheel load sensors 76, 78 may consist of sensors of a type which detects a relative displacement between the corresponding axle and the body of the vehicle, that occurs due to a change in the amount of elastic deformation of suspension springs, depending upon varying loads applied to the pairs of front and rear wheels. As the front-wheel and rear-wheel brake-force sensors 80, 82, it is possible to use strain gauges arranged to detect forces exerted to the brackets that support the calipers 12, 13, and 14, 15, upon brake application.

Figure 2:
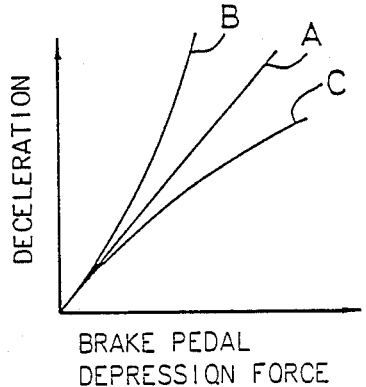
FIGS. 2, 3 and 4 are graphs which show control patterns stored in a control pattern memory of the braking system of FIG. 1.
Figure 3:
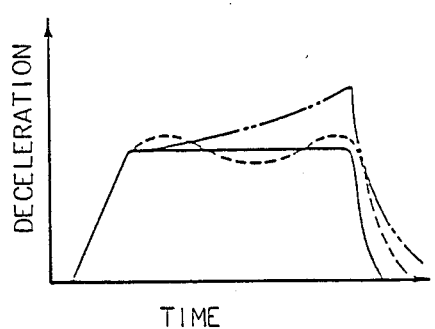
Figure 4:
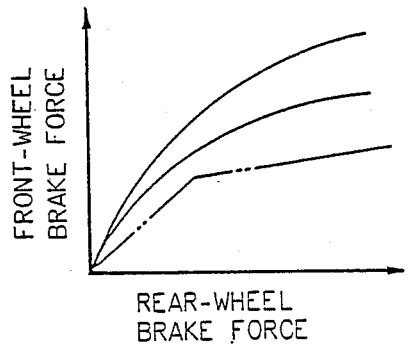

The computer 68 of the controller 70 incorporates a control pattern memory 84 which is adapted to store various control pattern data as indicated in solid lines in FIGS. 2 through 4. Lines A, B and C shown in FIG. 2 indicate braking-effect control patterns representative of different relations between the operation force exerted to the brake pedal 25, and the desired rate of deceleration of the vehicle, i.e., desired braking effect to be applied to the vehicle. Line A indicates a most commonly used braking effect pattern in which the deceleration rate or braking effect increases in proportion to the operating force applied to the brake pedal 25. Line B shows a braking effect pattern wherein the rate of increase in the deceleration rate increases as the operating force acting on the brake pedal 25 increases. This pattern gives the vehicle driver a "sporty" braking feel. Line C represents a pattern in which the rate of increase in the deceleration rate decreases with an increase in the operating force on the brake pedal 25. This pattern produces a "smooth" braking effect, permitting a better vehicle deceleration comfort. The vehicle driver may select desired one of the three patterns A, B and C, with operator-controlled pattern selecter means in the form of a selector 86 which is connected to the controller 70.

The graph of FIG. 3 shows a timing control pattern indicative of a relation after a time lapse between the commencement of brake application to the vehicle, and the desired deceleration rate of the vehicle (desired braking effect). Generally, the deceration rate of the vehicle upon each brake application is varied as a function of time as indicated in two-dot chain line or dashed line in FIG. 3, due to a change of the friction coefficient of the brake pads or other changing parameters, even if the operation force action on the brake pedal 25 is kept constant. However, the control pattern memory 84 stores the relation as indicated in solid line in the figure.

As a matter of course, it is possible to use other deceleration-time relations wherein the deceleration rate varies as a function of time, to produce a desired braking effect.

The control pattern memory 84 further stores a plurality of brake force distribution control patterns, as shown in solid lines in FIG. 4 by way of examples. Each control pattern represents a desired relation between a sum of brake forces applied to the front wheels and a sum of brake forces applied to the rear wheels. The control patterns are provided corresponding to different load conditions of the vehicle. Controlling the ratio of brake forces of the front wheels to the rear wheels according to the selected one of the control patterns, will avoid a decrease in the straight-line running stability of the vehicle, due to skidding of the front wheels prior to that of the rear wheels, or vice versa. Conventionally, a proportioning valve is used with or without a load sensor, for example, to control the fluid pressures in the rear-wheel brakes, in order to provide a front-rear brake force distribution as indicated in two-dot chain line in FIG. 4. However, a brake force produced by a brake is determined by a friction coefficient of the friction pads, as well as a pressure level of the fluid in the brake. It is inevitable that the friction coefficient of the friction pads is varied over a considerably wide range. Accordingly, it has been difficult to provide an ideal distribution of brake forces between the front and rear brakes. Further, the use of a proportioning valve with a load sensor suffers from extreme difficulty in adjusting the load sensor during installation on the vehicle. According to the present braking system of the invention, the controller 70 is adapted to detect a load condition of the vehicle based on the signals generated by the load sensors 76, 78, and select one of the disbritution patterns which suits the detected load condition of the vehicle. The fluid pressures in the brake cylinders 17, 19 of the second front-wheel and rear-wheel brakes 21, 23 are controlled according to the selected distribution pattern, so that the brake forces applied to the front wheels are changed in a suitable proportion to the brake forces applied to the rear wheels.

As understood from the foregoing description, the controller 70 having the control pattern memory 84 serves as a controller for controlling the solenoid-operated control valves 58, 59, 60 and 61 of the second brake system including the second brakes 21 and 23.

The operation of the present braking system will be described.

When a key switch of the vehicle is turned on, power is applied to the controller 70, and the computer 68 is automatically initialized. More specifically, various counters, flags, memorys, etc. are set, reset or cleared to their initial positions. For example, the braking effect pattern (deleration-brake pedal depression curve) A of FIG. 4 is selected as an initially set pattern. If needed, the vehicle driver may replace the initially set pattern A by another control pattern B or C, by operating the selector 86 after the initialization of the computer 68 is terminated. By way of illustration, the operation of the braking system will be described, assuming that the braking-effect control pattern B has been selected by the vehicle driver.

While the output signal of the vehicle deceleration sensor 74 is indicating substantially no deceleration or acceleration of the vehicle, the computer 68 determines the load condition of the vehicle based on the output signals received from the front-wheel and rear-wheel load sensors 76, 78. Based on the determined load condition, the computer 68 selects the appropriate one of the brake-force distribution control patterns as shown in FIG. 4. The above steps are repeated while the vehicle is running at a constant speed. When a rate of deceleration or acceleration of the vehicle exceeding a predetermined limit is detected, the above steps of operation are interrupted.

If the brake pedal 25 is depressed during while the vehicle is running, the fluid pressure corresponding to the depression force on the pedal 25 is generated in the master cylinder 24. Since the solenoid-operated control valves 30, 32 are normally placed in the first position for communication of the master cylinder 24 with the brake cylinders 16, 18, the pressure of the master cylinder 24 is applied to the brake cylinders 16, 18, whereby the first front-wheel brakes 20, and the first rear-wheel brakes 22 are activated. In the meantime, the computer receives a signal of the pressure sensor 72 indicative of the operating force acting on the brake pedal 25. Based on the signal from the pressure sensor 72, and the braking-effect control pattern B of FIG. 2, the computer 68 obtains a desired rate of deceleration of the vehicle, i.e., a desired braking effect. Then, the computer 68 calculates an actual rate of deceleration of the vehicle based on the output signal of the vehicle deceleration sensor 74. The computer 68 calculates a difference between the desired and actual rates of deceleration, that is, an amount of insufficiency of the actual deceleration with respect to the desired deceleration rate.

In the event that the actual rate of deceleration by activation of the first brakes 20, 22 is higher than the desired rate of deceleration due to rust on the disc rotors 10 and/or 11, for example, the computer 68 commands the solenoid-operated control valves 30, 32 of the first brake system so that the deceleration rate obtained by the first brakes 20, 22 is reduced to the desired deceleration rate.

Further, the computer 68 calculates actual brake forces applied to the front and rear wheels, based on the output signals of the front-wheel and rear-wheel brake-force sensors 80, 82. The brake forces produced by the first front-wheel brakes 20 and the first rear-wheel brakes 22 are determined according to the selected brake-force distribution control pattern of FIG. 4. However, it is inevitable that the actual distribution between the front and rear brake forces more or less deviates from the desired or ideal distribution represented by the control pattern. In view of this tendency, the computer 68 calculates the fluid pressures to be applied to the second front-wheel brakes 21 and the second rear-wheel brakes 23, based on the obtained amount of insufficiency of the actual deceleration and the amount of deviation of the brake force distribution between the front and rear wheels. Based on the calculated fluid pressures, the computer 68 determines the amounts of electric current to be applied to the solenoids 64, 66 and to the solenoids 65, 67. With the determined electric currents applied to these solenoids, the second brakes 21, 23 are operated in order to increase the brake forces for the front and rear wheels.

In the next control cycle, the actual vehicle deceleration rate, and the actual brake forces for the wheels, are again detected by the vehicle deceleration sensor 74, and the front-wheel and rear-wheel brake-force sensors 80, 82, and the above-indicated control cycle is repeated so as to control the actual deceleration rate of the vehicle, substantially in accordance with the desired deceleration rate, while maintaining the distribution rate of the front and rear brake forces at an optimum value that suits the current load condition of the vehicle. Of course the supply of the electric current to the solenoids 65, 67 is cut off to reduce the fluid pressures in the brake cylinders 17, 19, if the brake forces produced by the second brakes 21, 23 have exceeded the desired values. In this case, the supply of the electric current to the solenoids 64, 66 may also be cut off if desired.

Figure 5:
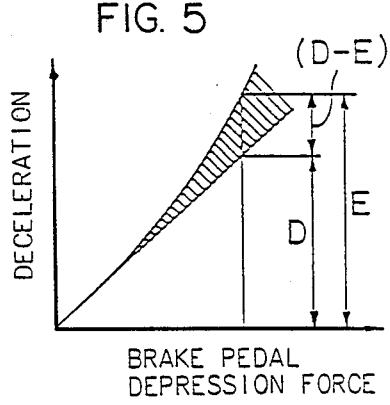
FIG. 5 is an explanatory graphical representation illustrating braking effects (deceleration rates of the vehicle) produced by a first and a second brake of the braking system.

It will be understood from the foregoing description that the second brakes 21, 23 are operated to produce a braking effect (an amount of deceleration) equal to a difference (D−E) between a deceleration rate D obtained by the first brakes 20, 22, and the desired deceleration rate E, as shown in FIG. 5. Therefore, the solenoid-operated control valves 58–61 of the second brakes 21, 23, and the second-brake controller 70 for the control valves, can serve their function if these members are capable of compensating for a relatively small portion of the desired deceleration amount indicated by hatched area in FIG. 5.

In the event that one of the first and second brake systems of the instant braking system fails, brake can be applied to the vehicle by the normal one of the two systems, since the two brake systems are independent of each other. Thus, the present braking system assures safety of the vehicle upon failure of either one of the first and second brake systems.

In the illustrated embodiment, the fluid pressures in the second brakes 21 for the left-front and right front wheels are changed simultaneously. Similarly, the fluid pressures in the second brakes 23 for the left-rear and right-rear wheels are also changed simultaneously. However, the fluid pressures in the second brakes 21 for the front wheels, or in the second brakes 23 for the rear wheels, may be changed independently of each other. Further, the fluid pressures in all of the four second brakes 21, 23 may be changed independently of each other. In this latter case, it is desirable to provide each of the wheels with a load sensor and a brake force sensor.

In the illustrated embodiment, the second brakes 21, 23 are controlled according to the predeermined control patterns, i.e., so as to satisfy a relation between the brake pedal operating force and the desired rate of vehicle deceleration, a relation between the desired deleceration rate and time, and a relation between the brake forces of the front wheels and those of the rear wheels, as previously discussed. However, the principle of the present invention may be practiced without one or two of these three control functions. Further, it is possible to modify the controller 70 so that other second-brake control functions may be additionally achieved. For example, it is possible to activate the second brakes 21, 23 during a temporary stop of the vehicle on a slope, in order to prevent the vehicle from rolling down the slope, or during a temporary stop of the vehicle equipped with an automatic transmission, in order to avoid the vehicle from starting. Further, the braking system may be provided with a traction controller for activating the second brakes when the slip ratios of the drive wheels exceed a predetermined limit when the vehicle is started, or when a difference between the slip ratios of the left and right wheels exceeds a limit, due to a difference of the friction coefficient of the road surfaces.

While the two calipers 12, 13 or 14, 15 are used for the first and second brakes 20, 21 or 22, 23, respectively, the two brake cylinders for the first and second brakes may be mounted on a single caliper. Although the second brakes 21, 23 are hydraulically operated, the second brakes may consist of other types of brakes such as electromagnetic brakes and regenerative brakes.

While the present invention has been described in its preferred embodiment with a certain degree of particularity, it is to be understood that the invention is not limited thereto, but may be embodied with various changes, modifications and improvements other than indicated above, which may occur to those skilled in the art, without departing from the spirit and scope of the invention defined in the following claims.

What is claimed is:

1. A braking system for an automotive vehicle, having a first and a second brake system, wherein said first brake system includes:
   an operator-controlled brake operating member;
   a master cylinder responsive to an operation of said brake operating member, for generating a fluid pressure which corresponds to an operation value of said brake operating member; and
   a first brake actuated by the fluid pressure generated by said master cylinder, so as to produce a braking effect which is smaller than a desired braking effect corresponding to said operation value of said brake operating member, and wherein said second brake system includes:
   a second fluid actuated brake;
   a first detecting device for detecting said operation value;
   a second detecting device for detecting an actual braking effect applied to said vehicle by said first brake; and
   a controller connected to said second brake, and said first and second detecting devices, said controller including comparing means for comparing said actual braking effect with said desired braking effect to determine a difference between said actual and desired braking effects, and means for operating said second brake so as to produce a braking effect equal to said difference between said actual and desired braking effects.

2. A braking system according to claim 1, wherein said controller includes a computer which comprises a control pattern memory storing at least one braking-effect control pattern representative of a relation between said operation value of said brake operating member and said desired braking effect.

3. A braking system according to claim 2, wherein said control pattern memory stores a plurality of braking-effect control patterns representative of different relations between said operation value and said desired braking effect, said computer having means for automatically selecting a predetermined one of said plurality of braking-effect control patterns, as an initially set pattern, upon application of power to said controller, said braking system further comprising an operator-controlled pattern selector means connected to said controller, said computer replacing the automatically selected one of said braking-effect control patterns by another selected by said pattern selector means.

4. A braking system according to claim 2, wherein said first detecting device detects an operating force exerted to said brake operating member, and said second detecting device detects a rate of deceleration of the vehicle, said control pattern memory storing control pattern data representative of a relation between said operation force and said rate of deceleration.

5. A braking system according to claim 4, wherein said operator-controlled brake operating member consists of a foot-operated brake pedal, and said first detecting device comprises a pressure sensor disposed on a pedal pad of said brake pedal, said second detecting device comprising a deceleration sensor operable for detecting said rate of deceleration of the vehicle.

6. A braking system according to claim 2, wherein said first brake and said second brake are provided for each of a left-front and a right-front wheel, and a left-rear and a right-rear wheel of the vehicle, said controller including a control pattern memory storing at least one distribution control pattern representative of a further desired relation between a sum of front-wheel brake forces of said first and second brakes for said left-front and right-front wheels, and a sum of rear-wheel brake forces of said first and second brakes for said left-rear and right-rear wheels, said second brake for said left-front and right-front wheels being controlled according to said desired relation.

7. A braking system according to claim 6, further comprising a front-wheel load sensor for sensing a load applied to said left-front and right-front wheels, a rear-wheel load sensor for sensing a load applied to said left-rear and right-rear wheels, a front-wheel brake-force sensor for sensing said front-wheel brake forces, and a rear-wheel brake-force sensor for sensing said rear-wheel brake forces.

8. A braking system according to claim 2, wherein said controller includes a further control pattern memory which stores a timing control pattern indicative of a relation between a time lapse from a start of brake application to the vehicle, and a desired braking effect, said second brake being controlled according to said relation between said time lapse and said desired braking effect.

9. A braking system according to claim 1, wherein said second brake is hydraulically operated, and said second brake system includes:
   a hydraulic pressure source operated by a power unit to generate a fluid pressure;
   a reservoir for storing a working fluid; and
   solenoid-operated control valve means controlled by said controller, between a first position for communication of a brake cylinder of said second brake with said hydraulic pressure source, and a second position for communication of said brake cylinder of said second brake with said reservoir.

10. A braking system according to claim 1, wherein said first brake system further includes:
    first solenoid-operated control valve means disposed in a fluid passage between said master cylinder and said first brake, and operable between a first position for communication of said first brake with said master cylinder, and a second position for communication of said first brake with a reservoir; and
    an emergency control circuit operable for normally placing said first solenoid-operated control valve means in said first position for communication of said first brake with said master cylinder, and for placing said first solenoid-operated control valve means in said second position for communication of said first brake with said reservoir, if the actual braking effect produced by said first brake exceeds said desired braking effect.

11. A braking system according to claim 1, wherein said controller includes a traction controller operable for activating said second brake so as to maintain a slip ratio of a drive wheel of the vehicle within another predetermined optimum range, if said slip ratio has exceeded another predetermined upper limit, when said vehicle is started.

12. A braking system according to claim 1, wherein said controller includes a controller operable for activating said second brake while said vehicle is temporarily stopped.

13. A braking system for an automotive vehicle, having a first and a second brake system, wherein said first brake system includes:

an operator-controlled brake operating member;

a master cylinder responsive to an operation of said brake operating member, for generating a fluid pressure which corresponds to an operation value of said brake operating member; and a first brake actuated by the fluid pressure generated by said master cylinder, so as to produce a rate of deceleration of the vehicle which is smaller than a desired rate of deceleration of the vehicle corresponding to said operation value of said brake operating member, and wherein said second brake system includes:

a hydraulic pressure source operated by a power unit to generate a fluid pressure;

a reservoir for storing a working fluid;

a second brake having a brake cylinder actuated by the fluid pressure generated by said hydraulic pressure source;

a solenoid-operated control valve means operable between a first position for communication of said brake cylinder of said second brake with said hydraulic pressure source, and a second position for communication of said brake cylinder of said second brake with said reservoir;

a first detecting device for detecting said operation value;

a second detecting device for detecting an actual rate of deceleration of said vehicle; and a controller connected to said solenoid-operated control valve means, and said first and second detecting devices, said controller including comparing means for comparing said actual rate of deceleration with said desired rate of deceleration, and controlling said solenoid-operated control valve means to operate said second brake so as to produce a rate of deceleration of the vehicle equal to a difference between said actual and desired rates of deceleration of the vehicle.

14. A braking system for an automotive vehicle, having a first and a second brake system, wherein said first brake system includes:

an operator-controlled brake operating member;

a master cylinder responsive to an operation of said brake operating member, for generating a fluid pressure which corresponds to an operation value of said brake operating member; and a first brake actuated by the fluid pressure generated by said master cylinder, so as to produce a braking effect which is smaller than a desired braking effect corresponding to said operation value of said brake operating member, and wherein said second brake system includes:

a hydraulic pressure source operated by a power unit to generate a fluid pressure;

a reservoir for storing a working fluid;

a second brake having a brake cylinder actuated by the fluid pressure generated by said hydraulic pressure source;

a solenoid-operated control valve means operable between a first position for communication of said brake cylinder of said second brake with said hydraulic pressure source, and a second position for communication of said brake cylinder of said second brake with said reservoir;

a first detecting device for detecting said operation value;

a second detecting device for detecting an actual braking effect applied to said vehicle; and a controller connected to said solenoid-operated control valve means, and said first and second detecting devices, said controller including comparing means for comparing said actual braking effect with said desired braking effect, and controlling said solenoid-operated control valve means to operate said second brakes as to produce a braking effect equal to a difference between said actual and desired braking effects.

* * * * *